(12) United States Patent
Song et al.

(10) Patent No.: US 9,078,176 B2
(45) Date of Patent: Jul. 7, 2015

(54) SYSTEM AND METHOD FOR MULTI-HIERARCHICAL CELL CONFIGURATION

(71) Applicant: ELECTRONICS AND TELECOMMUNICATIONS RESEARCH INSTITUTE, Daejeon (KR)

(72) Inventors: Pyeong Jung Song, Daejeon (KR); Hyun Seo Park, Daejeon (KR); Seung Chan Bang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 108 days.

(21) Appl. No.: 13/631,486

(22) Filed: Sep. 28, 2012

(65) Prior Publication Data
US 2013/0084868 A1   Apr. 4, 2013

(30) Foreign Application Priority Data

Sep. 29, 2011 (KR) .................. 10-2011-0098664
Jul. 10, 2012 (KR) .................. 10-2012-0074817

(51) Int. Cl.
*H04W 36/00* (2009.01)
*H04W 28/00* (2009.01)
*H04W 72/00* (2009.01)
*H04W 84/00* (2009.01)
*H04W 4/04* (2009.01)
*H04W 84/04* (2009.01)
*H04W 28/06* (2009.01)

(52) U.S. Cl.
CPC .......... *H04W 36/0055* (2013.01); *H04W 28/06* (2013.01); *H04W 72/00* (2013.01); *H04W 84/005* (2013.01); *H04W 4/046* (2013.01); *H04W 84/045* (2013.01)

(58) Field of Classification Search
CPC ... H04W 28/06; H04W 72/00; H04W 84/005; H04W 4/046; H04W 84/045; H04W 36/0055
USPC ........ 370/236.1, 236.2, 241.1, 252, 255, 256, 370/310, 310.2, 328, 329, 330, 331, 332, 370/334, 338; 455/422.1, 424, 425, 429, 455/432.1, 434, 435.2, 435.3, 436, 437, 455/438, 439, 440, 441, 442, 445, 446, 447, 455/448, 449, 450, 451, 452.1, 452.2, 455, 455/456.1, 456.5, 456.6
See application file for complete search history.

(56) References Cited

U.S. PATENT DOCUMENTS

2005/0130662 A1*  6/2005  Murai ........................... 455/444
2006/0121914 A1*  6/2006  Kim et al. .................. 455/456.1
(Continued)

OTHER PUBLICATIONS

Macato Hiruta et al. "A Study on Optical Wireless Train Communication System Using Mobile Object Tracking Technique", ICACT 2009, Feb. 15-Feb. 18, 2009, pp. 35-40.

*Primary Examiner* — Dinh P Nguyen

(57) ABSTRACT

Provided is a system and method for configuring a multi-hierarchical cell in which a large-scale mobile backhaul technology and a small cell technology are combined. A mobile backhaul may increase a transmission capacity of a wireless backhaul using a super high frequency (SHF)/extremely high frequency (EHF) band, rather than a cellular band having a limitation in extending frequency resources, and a small group cell to be formed at a final end of the mobile backhaul may be configured by fixed group cells or mobile group cells depending on a radio environment, using a moving relay, wireless fidelity (WiFi), femto-cells, and the like, whereby cells may be miniaturized effectively, and a relatively great capacity of a wireless system may be provided to a subscriber.

14 Claims, 10 Drawing Sheets

(56) References Cited

U.S. PATENT DOCUMENTS

2006/0230159 A1* 10/2006 Jones et al. .................. 709/228
2008/0080604 A1* 4/2008 Hur et al. ..................... 375/224
2009/0029645 A1* 1/2009 Leroudier ........................ 455/7
2010/0062768 A1* 3/2010 Lindqvist et al. .......... 455/435.1
2010/0238826 A1 9/2010 Borran et al.
2011/0276686 A1* 11/2011 Tung et al. ................... 709/224
2012/0094643 A1* 4/2012 Brisebois et al. ............ 455/418

* cited by examiner

Clustered device

SYSTEM AND METHOD FOR MULTI-HIERARCHICAL CELL CONFIGURATION

CROSS-REFERENCE TO RELATED APPLICATIONS

This application claims the benefit of Korean Patent Application No. 10-2011-0098664, filed on Sep. 29, 2011, and Korean Patent Application No. 10-2012-0074817, filed on Jul. 10, 2012, in the Korean Intellectual Property Office, the disclosures of which are incorporated herein by reference.

BACKGROUND

1. Field of the Invention

The present invention relates to a system and method for configuring a multi-hierarchical cell in which a large-scale mobile backhaul technology and a small cell technology are combined based on the multi-hierarchical cell and a multi-layer spectrum structure in a wireless access system. A mobile backhaul may use a super high frequency (SHF)/extremely high frequency (EHF) band, and a small group cell may use a radio relay, wireless fidelity (WiFi), and the like.

2. Description of the Related Art

With a recent spread of smart devices, an upsurge in mobile traffic is expected due to N-screen services, cloud services, and the like. However, a limitation may exist in dealing with such an upsurge through use of current cellular based technology which is working on an additional expansion of a portion of a cellular band, or performance improvement of a 4th generation (4G) wireless transmission scheme, and the like.

In addition, with the spread of smart devices, an increase in a demand for Internet multimedia services available in high speed mass transportation, for example, a train, a bus, an automobile, and the like, is also expected. However, with the current cellular system, spectrum efficiency may drop sharply when moving at a high rate of speed and thus, a high speed data service may be unfeasible.

SUMMARY

An aspect of the present invention provides a method of configuring a cell of a wireless communication system having a multi-hierarchical structure and configured with a multi-hierarchical frequency band, in order to increase a traffic capacity.

Another aspect of the present invention also provides a system having a multi-hierarchical structure and a multi-hierarchical frequency band, configured with up to N links and up to N frequency bands in an N-hierarchical overlay cell structure using an identical radio access technology (RAT).

Still another aspect of the present invention also provides a system and method that may improve radio resource use efficiency by integrally optimizing spectrum management, interference management, radio resource management, and the like between multiple tiers, depending on a change in a radio environment in a multi-hierarchical cell structure, through real-time learning.

Yet another aspect of the present invention also provides a system and method that may offload a mobile traffic of an existing cellular cell onto a group cell, through a seamless mobility between the existing cellular cell and a suggested group cell.

According to an aspect of the present invention, there is provided a system configured by a multi-hierarchical cell, the system including a service infrastructure to provide accumulated knowledge, a device infrastructure, including devices, to be supplied with the accumulated knowledge from the service infrastructure, a network infrastructure to provide a network connection between the service infrastructure and the device infrastructure, and a platform infrastructure to perform a task of processing data collected from the device infrastructure and the network infrastructure into knowledge, and accumulating the knowledge in the service infrastructure.

According to another aspect of the present invention, there is also provided a handover method according to an in-bound mobility in a device of a system configured by a multi-hierarchical cell, the method including receiving group cell measurement guide information from a cell of a cellular system, through a measurement control message, searching for adjacent group cells and measuring signal-interference ratios (SIRs) of found adjacent group cells, based on the group cell measurement guide information, determining a group cell with a greatest SIR to be a target group cell for handover, transmitting a measurement report to the cell of the cellular system when the SIR of the target group cell is greater than a predetermined measurement report threshold, preparing to perform handover by receiving system information from the target group cell when a command to receive the system information of the target group cell is received from the cell of the cellular system, and performing the handover to the target group cell.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
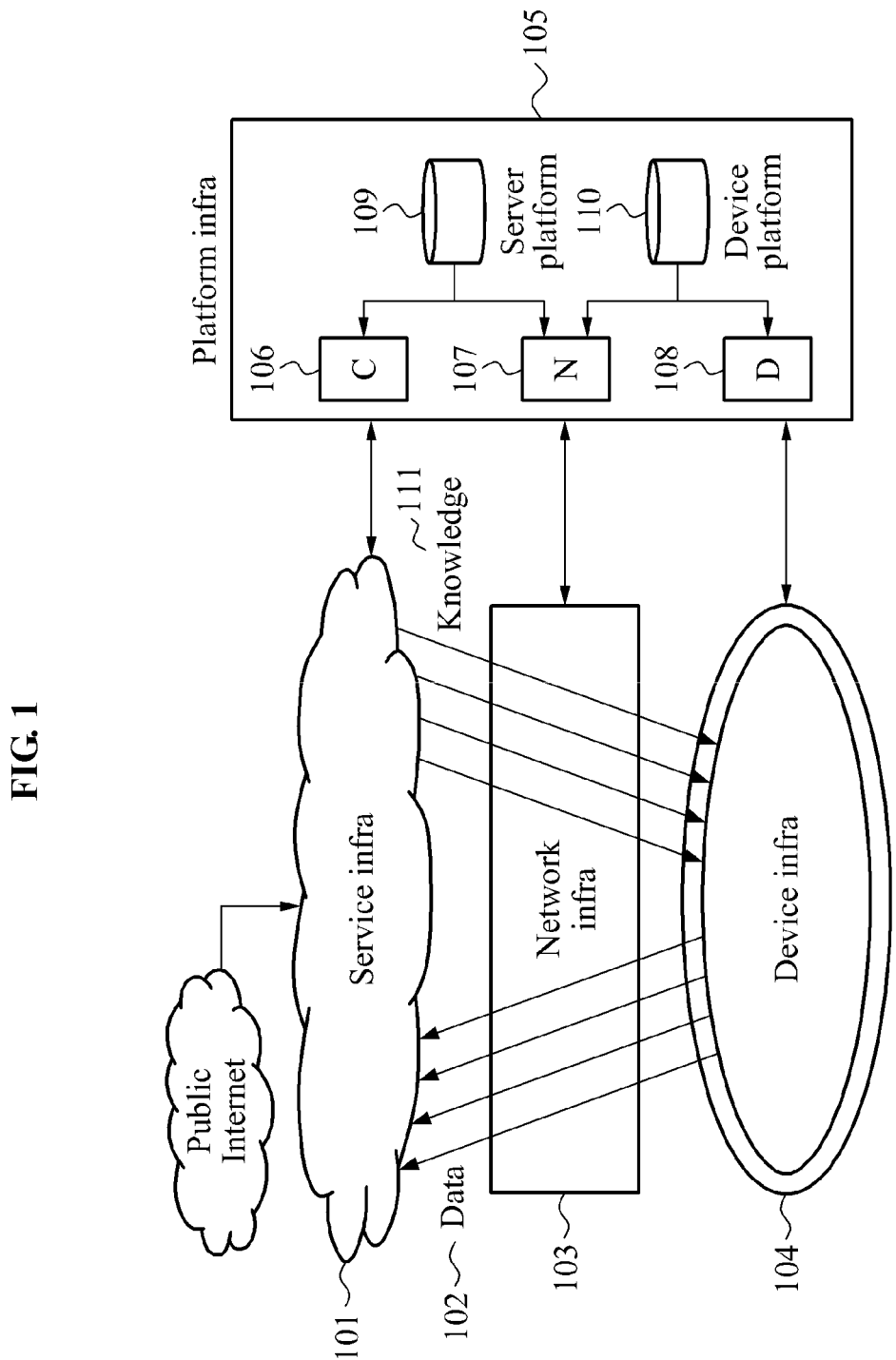
FIG. 1 is a diagram illustrating a brief configuration of a wireless communication system having a multi-hierarchical cell structure and configured with a multi-hierarchical frequency band according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

By way of reference, terms and a background of technology used herein are based on the 3rd Generation Partnership Project (3GPP) Long-Term Evolution (LTE)/Long-Term Evolution-Advanced (LTE-A) or IEEE Mobile WiMAX standards. Hereinafter, the term "group cell" may refer to a cell in which the entirety of a predetermined group operates like a single cell, and the group cell may be accessed to a network through at least one backhaul.

FIG. 1 is a diagram illustrating a brief configuration of a wireless communication system having a multi-hierarchical cell structure and configured with a multi-hierarchical frequency band according to an embodiment of the present invention.

Referring to FIG. 1, the wireless communication network may include a service infrastructure 101, a network infrastructure 103, a device infrastructure 104, and a platform infrastructure 105.

The service infrastructure 101 may provide knowledge 111 accumulated through the device infrastructure 104 and the network infrastructure 103, using a variety of applications and contents.

The device infrastructure 104 may include smart devices, and portable terminals, and may be provided with the accumulated knowledge 111.

The network infrastructure 103 may provide a network connection between the service infrastructure 101 and the device infrastructure 104.

The platform infrastructure 104 may perform a task of processing data 102 collected from the device infrastructure 104 and the network infrastructure 103 into the knowledge 111, and accumulating the knowledge 111 in the service infrastructure 101, for the applications and contents provided through the service infrastructure 101.

The platform infrastructure 105 may include a content domain 106, a network domain 107, a device domain 108, a server platform 109, and a device platform 110.

The content domain 106 may perform a task required for the service infrastructure 101 based on multi-processing.

The network domain 107 may perform a task required for the network infrastructure 103.

The device domain 108 may perform a task required for the device infrastructure 104 based on single-processing.

The server platform 109 may be utilized by the content domain 106 or the network domain 107.

The device platform 110 may be utilized by the network domain 107 or the device domain 108.

Figure 2:
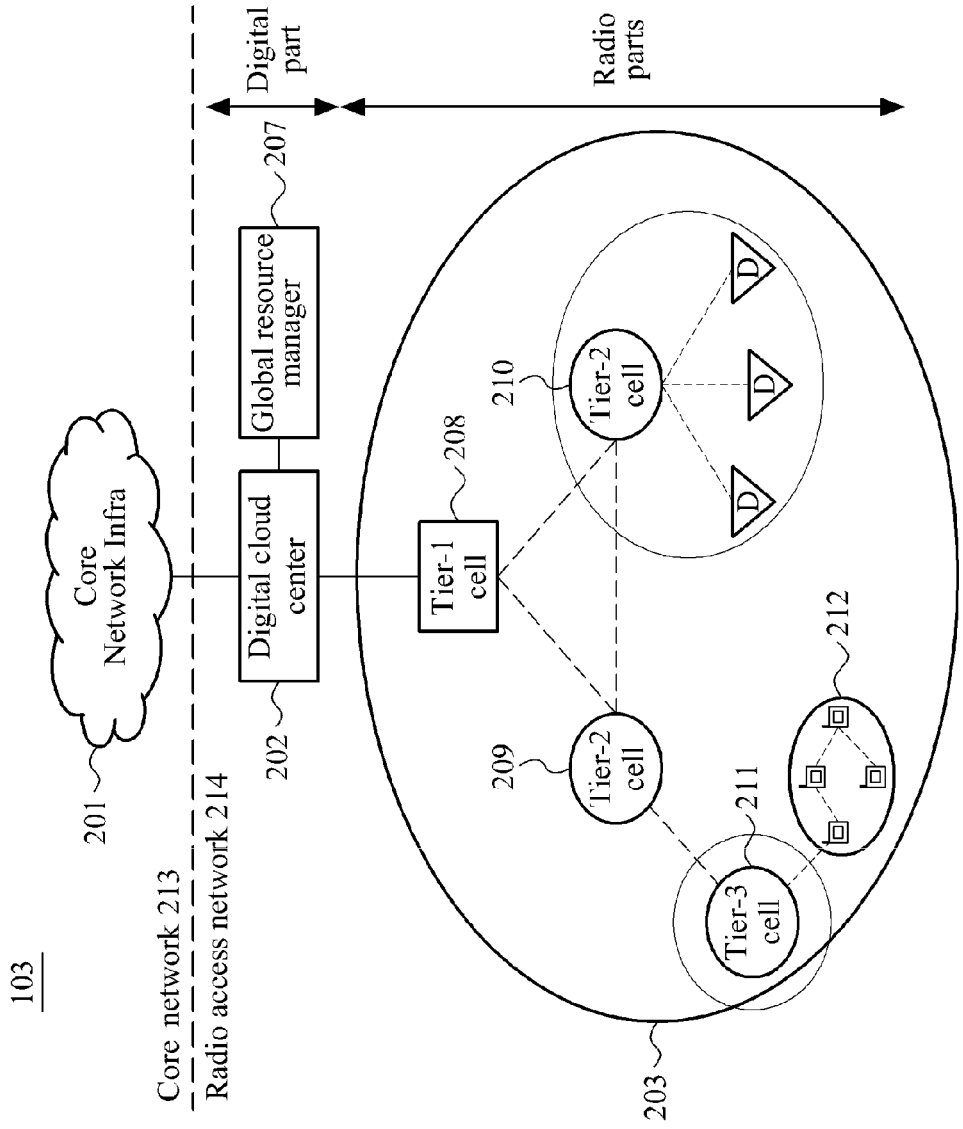
FIG. 2 is a diagram illustrating a configuration of a network infrastructure of FIG. 1.

FIG. 2 is a diagram illustrating a configuration of the network infrastructure 103 of FIG. 1.

Referring to FIG. 2, the network infrastructure 103 may be largely classified into a core network 213 and a radio access network 214.

The radio access network 214 may include a digital cloud center 202, and a multi-hierarchical cell 203 of which radio resources may be controlled and managed by a global resource manager 207 that operates in the digital cloud center 202.

The multi-hierarchical cell 203 may be configured by a plurality of large and small cells. When the multi-hierarchical cell 203 is configured with N cells, up to N links and up to N frequency bands may be utilized for each type of cell.

Here, when comparing a function of the radio access network 214 to a function of a current base station, a base station modem function, a media access control (MAC) function, a protocol software (SW) function, and the like may be performed by the digital cloud center 202, and radio frequency (RF)/antenna parts, that is, radio parts, corresponding to a wireless transceiver may be installed to be distributed, based on the multi-hierarchical cell 203, as follows.

A first hierarchical cell, for example, a tier-1 cell 208, may be installed in an area in which a line of sight (LoS) is relatively great, like a rural area, and may be classified as a macro-cell.

A second hierarchical cell, for example, a tier-2 cell 209 or 210, may be installed in an urban area, on a road, and the like, and may be classified as a micro-cell which is smaller than the macro-cell.

A third hierarchical cell, for example, a tier-3 cell 211, may be installed inside a home, a train, an automobile, and the like, and may be classified as a pico-cell which is smaller than the micro-cell.

In an N-tier cell topology, a multi-hierarchical cell configured by N tiers may include an N-hierarchical link, that is, Link-n, and an N-hierarchical frequency band, that is, Band-n. In this instance, each hierarchical cell may be connected to an upper level cell or an identical level cell, via a radio link, for example an RF cable, or a wired link, for example, a fiber optic cable.

A small group cell 210 or 212 may be connected to an end of each link, and may provide a service to various types of devices positioned in an internal portion of the small group cell 210 or 212. Hereinafter, the small group cell will be referred to as a small cell. Here, the devices may include various types of smart devices, automobiles, home appliances, trains, buses, and the like. The small cell 212 may be provided in a structure supporting a device network configuration in which devices, for example, home appliances, smart devices, robot devices, medical devices, and the like, may be connected to each other directly.

Figure 3:
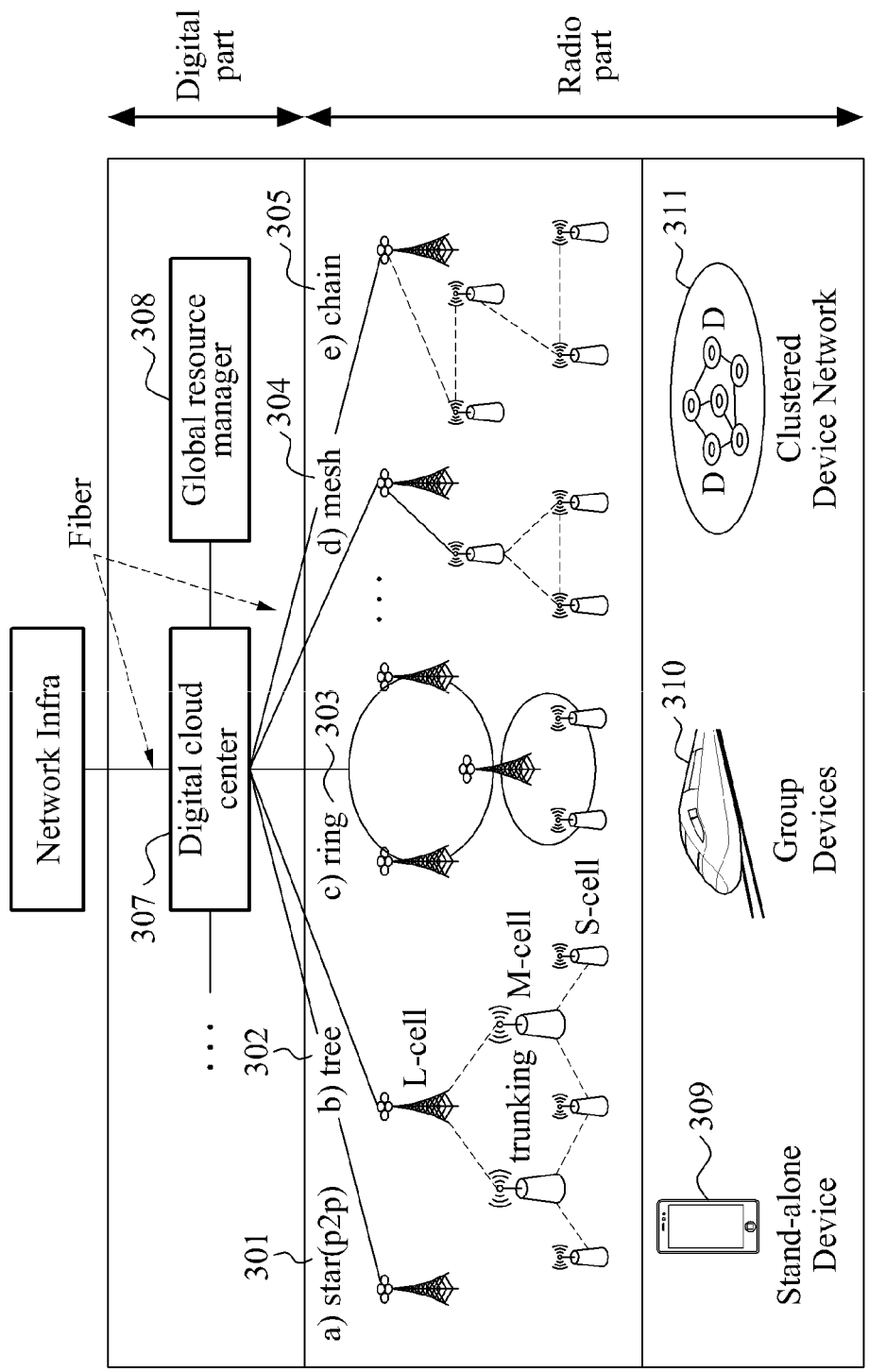
FIG. 3 is a diagram illustrating a network configuration method of each cell, integrally managed by a digital cloud center according to an embodiment of the present invention.

FIG. 3 is a diagram illustrating a network configuration method of each cell, integrally managed by a digital cloud center 307 according to an embodiment of the present invention.

Referring to FIG. 3, the network configuration method of each cell, integrally managed by the digital cloud center 307 through a global resource manager 308, may include a peer-to-peer (P2P) access scheme 301, a tree access scheme 302, a ring access scheme 303, a mesh access scheme 304, a chain access scheme 305, and the like.

In the P2P access scheme 301, each cell may be configured with the digital cloud center 307 in a P2P format. In the tree access scheme 302, a network may be configured between large and small cells in a tree format. In the ring access scheme 303, a network may be configured between cells in a format of a multi-hierarchical ring. In the mesh access scheme 304, a network may be configured between cells in a mesh format. In the chain access scheme 305, a network may be configured between cells in a chain format.

In FIG. 3, the various types of devices may be connected to a cell configured by a suitable network configuration method, among the schemes 301 through 305, based on a characteristic of a device. For example, a stand-alone device 309, for example, a smart device, may employ the tree access scheme 302 in which the smart device 309 may be connected from a large cell to a medium cell, and from the medium cell to a small cell, via an N-hierarchical radio link so that a radio environment in which an LoS between a cell and a device exists, may be established. Group devices 310, for example a high-speed train, may be connected to a cell configured by the ring access scheme 303. A clustered device network 311 may be connected to a cell using one of the P2P access scheme 301, the tree access scheme 302, the ring access scheme 303, the mesh access scheme 304, and the chain access scheme 305, through a main device acting as a gateway.

Figure 4:
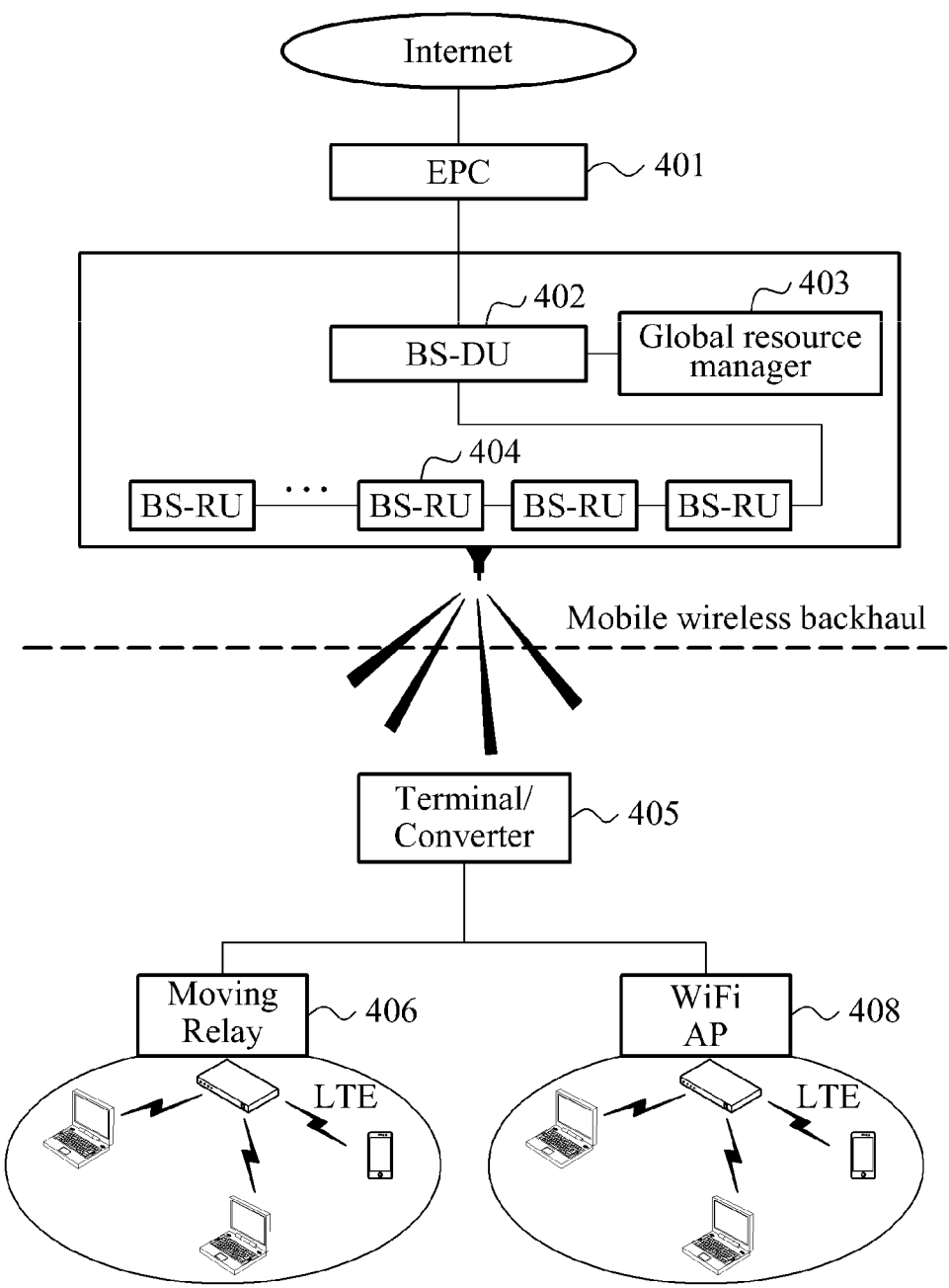
FIG. 4 is a diagram illustrating a configuration of a system configured by a multi-hierarchical cell, in particular, a 2-tier cell, according to an embodiment of the present invention.

FIG. 4 is a diagram illustrating a configuration of a system configured by a multi-hierarchical cell, in particular, a 2-tier cell, according to an embodiment of the present invention.

Referring to FIG. 4, a base station connected to the Internet via an evolved packet core (EPC) network 401 may include a base station-digital unit (BS-DU) 402, and a base station-radio unit (BS-RU) 404.

A terminal connected to a base station through a mobile wireless backhaul in a vehicle, for example an express bus, may correspond to an express bus group cell. In this instance, a moving relay 406 or a wireless fidelity (WiFi) access point (AP) 408 may correspond to the express bus group cell.

In a case of the express bus group cell, a terminal/converter 405 having a function of receiving a signal of a wireless transceiver corresponding to the BS-RU 404, and converting the received signal into a signal of a tier-2 cell may be attached to an upper portion plate of the express bus.

Here, the terminal/converter 405 may perform a function of acting as a terminal corresponding to the BS-RU 404, and a function of interworking the BS-RU 404 corresponding to a first hierarchical cell and an express bus cell corresponding to a second hierarchical cell when a radio access technology (RAT) used between the BS-RU 404 and the express bus cell is different.

In a case of the second hierarchical cell, a signal input through the terminal/converter 405 may be transmitted through the WiFi AP 408 or the moving relay 406 corresponding to the base station of the second hierarchical cell, and may be transferred to a general terminal through a final end wireless interface.

Figure 5:
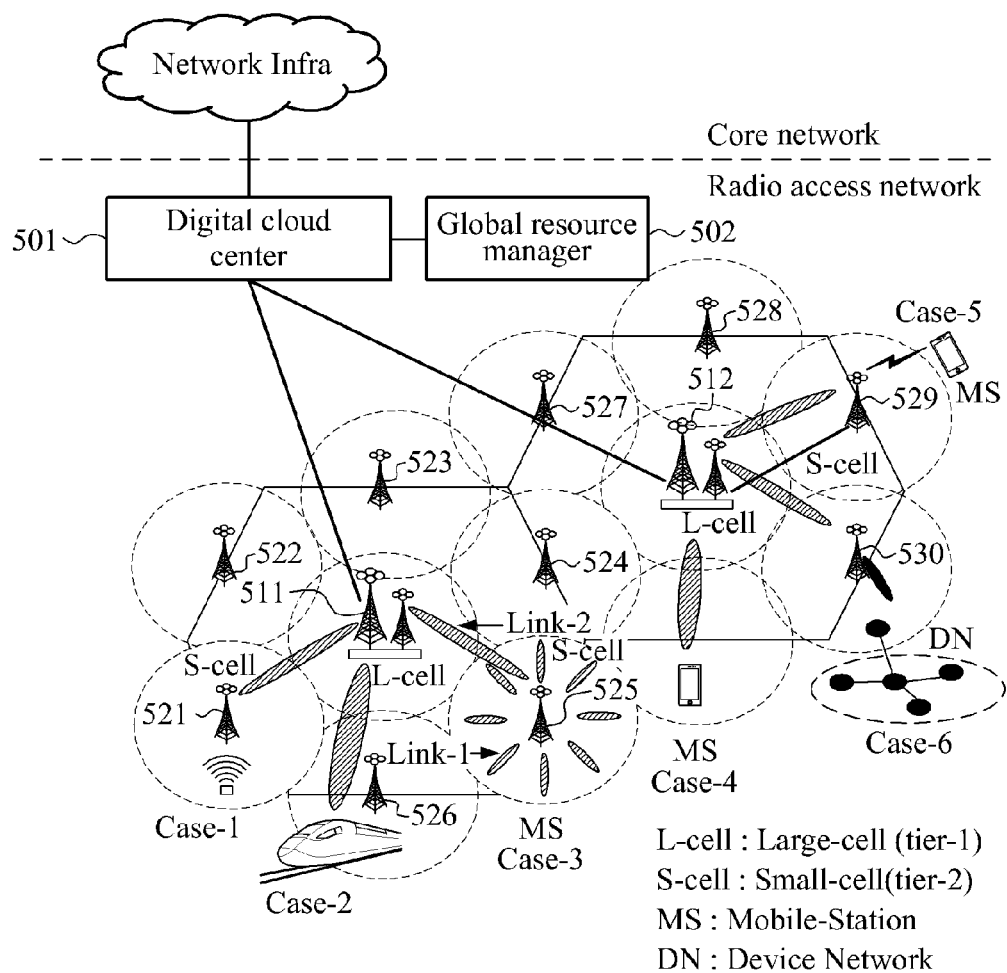
FIG. 5 is a diagram illustrating a substantial configuration of a 2-tier cell, including a large cell (L-cell) and a small cell (S-cell), according to an embodiment of the present invention.

FIG. 5 is a diagram illustrating a substantial configuration of a 2-tier cell, including a large cell (L-cell) and a small cell (S-cell), according to an embodiment of the present invention.

Referring to FIG. 5, a digital cloud center 501 may be connected to large cells (L-cells) 511 and 512, or small cells (S-cells) 521 through 530 via a radio link or a wired link, for example, a fiber optic cable. In this instance, types of link formed by a large cell, a small cell, and a device, for example a mobile station (MS), may include a Link-1 corresponding to a link between the large cell and the small cell, a Link-2 corresponding to a link between the small cell and the device, and a Link-3 corresponding to a link between the large cell and the device.

A backhaul link may be used for the Link-1 between the large cell and the small cell. The backhaul link may be connected through a super high frequency (SHF)/extremely high frequency (EHF) wireless band, or a fiber optic cable.

A radio link may be used for the Link-2 between the small cell and the device. The radio link may be connected through an SHF/EHF wireless band, a cellular band, WiFi, and the like.

A direct radio link may be used for the Link-3 between the large cell and the device. The direct radio link may be connected through the SHF/EHF wireless band.

According to the present embodiment, the Link-1 may utilize the SHF/EHF band in which a sufficiently wide frequency band may be available.

In FIG. 5, the digital cloud center 501 may perform a function of maximizing resource use efficiency of the entire system managed by the digital cloud center 501, by integrally managing available spectrum resources, a level of interference, and a scale of available virtual radio resources for all cells managed by the digital cloud center 501 through a global resource manager 502.

In order to increase the resource use efficiency, the digital cloud center 501 may perform all functions of analyzing positioning information and radio environment information of a device terminal, selecting and allocating a frequency band most suitable for a corresponding cell in real time using a communication quality, for example, a signal-interference ratio (SIR), and reconstructing a shape of the corresponding cell to be suitable for the allocated frequency band. The foregoing may be realized by utilizing a function of managing a software defined radio (SDR) base station platform, and the like which is generally known in the art.

In addition, the global resource manager 502 may perform a device mobility management function corresponding to a mobility management entity (MME) in the 3rd Generation Partnership Project (3GPP) Long-Term Evolution (LTE), a contents centric network (CCN) function, and the like.

Hereinafter, cases for each type of cell of FIG. 5 will be described.

A case-1 may correspond to a pico-cell using super WiFi, and may be suitable for a home, an office, and an indoor environment.

A case-2 may correspond to a pico-cell using a moving relay, and may be suitable for a group cell that moves outdoors, for example, a train, a bus, and the like.

A case-3 may correspond to a pico-cell using an SHF/EHF band, and may be suitable for a backbone of a device network, for example, an LoS outdoor hotspot, a vehicle network, and the like.

A case-4 may correspond to a micro-cell using a cellular band, and may be suitable for a non-LoS hotspot outdoors.

A case-5 may correspond to a macro-cell using a hybrid communication scheme in which a cellular band and an SHF/EHF band are used simultaneously, and may be suitable for a rural area in which a relatively small number of base stations are installed, and an LoS may be ensured readily since a small number of high buildings exist.

A case-6 may be suitable for a device network using an SHF/EHF band or a cellular band. In this instance, the device network may provide a communication service to devices included in the network, through a device acting as a gateway. The device may include a sensor, a home electric device, a medical device, an automobile device, a robot device, and the like.

In a case, other than the aforementioned cases, communication may be performed using a conventional cellular communication, for example, a third generation (3G) or fourth generation (4G) communication. In addition, consecutiveness of the communication may be realized through interworking with the pico-cell, the micro-cell, and the macro-cell, as necessary.

Figure 6:
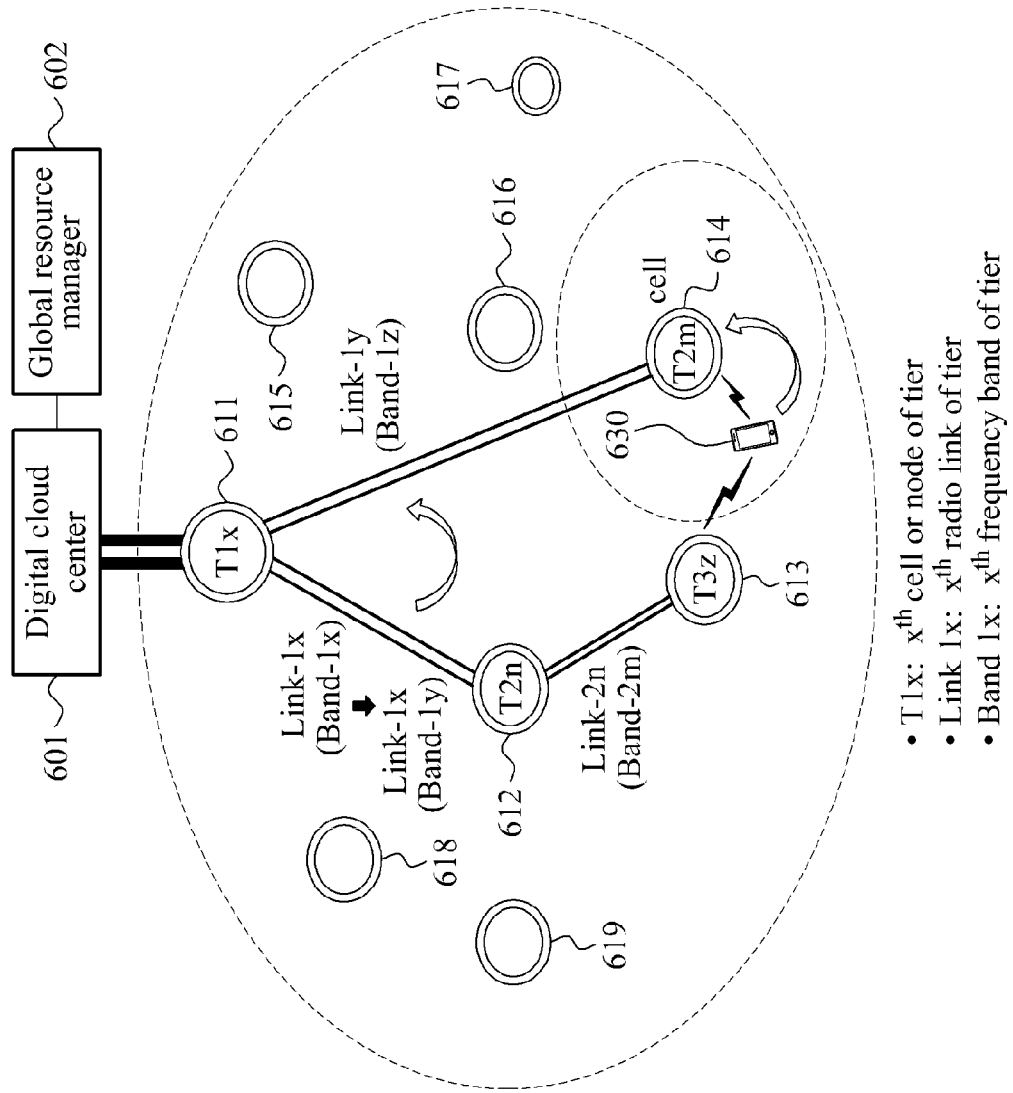
FIG. 6 is a diagram illustrating an example of a link connection from a system configured by small cells based on a multi-hierarchical cell structure and a real-time changing band to a device according to an embodiment of the present invention.

FIG. 6 is a diagram illustrating an example of a link connection from a system configured by small cells based on a multi-hierarchical cell structure and a real-time changing band to a device according to an embodiment of the present invention.

Referring to FIG. 6, the small cells may be configured by three operations as follows. In a first operation, a general communication common carrier may determine a number of base stations, and locations of the small cells, in view of the following factors. In this instance, the communication common carrier may use their own designing means, for example, a simulation method, and the like.

The locations of the small cells, for example, small cells 611 through 619, may be determined based on a maximum number of concurrent subscribers, a maximum supporting transmission rate per subscriber, an average quality of service (QoS) per service of a subscriber, and the like, such that an LoS radio environment may be guaranteed to be at a maximum.

In an area in which configuration of the small cells may be difficult, for example, an area in which ensuring an LoS may be difficult, an area determined through an actual field measurement test, and the like performed by the communication common carrier, and the like, communication may be supported by a general cellular cell.

In a second operation, a location of a digital cloud center 601, and a number of digital cloud centers 601 to be installed in a communication service target area may be determined, based on a computing power of the digital cloud center 601, a size of a storage space, a capability of a server, and the like.

In a third operation, the digital cloud center 601 may determine a radio link path to each of the small cells 611 through 619, through a global resource manager 602.

In this instance, examples of the radio link path will be described herein.

A single-link may refer to a radio link connected from the digital cloud center 601 to the small cell 614, by a single hop.

A multi-link may refer to a tier of radio links connected from the digital cloud center 601 to the small cell 613 such that ensuring an LoS in an internal portion of a multi-hierarchical cell may be supported to be at a maximum.

A radio link may use a cellular band, and an SHF/EHF band. The radio link may be installed readily at a relatively low cost, for example, a construction cost, when compared to a wired link, for example, an optical fiber cable, and the like.

A cognitive radio system (CRS) concept may be applied to each link such that a frequency band may be changed in real time depending on a radio environment. For example, it may be verified that a Band-$1x$ of a Link-$1x$ is changed to a Band-$1y$.

Base station equipment of a small cell T3$z$ 613 which is formed at a final end in the configuration of the link is not limited separately, however, may be configured by femtocells in an outdoor environment, and may be configured by WiFi cells in an indoor environment.

Here, a small cell may be configured dynamically and in real time, or may be reconstructed, as necessary, so that overall performance of the small cell managed by a predetermined digital cloud center may be maximized. As overall performance maximizing parameters of the predetermined digital cloud center, a path cost used for forming a radio link connected from the digital cloud center and each small cell, bandwidth resource use efficiency, a traffic processing capability of a small group cell, and a cell coverage, and the like may be considered.

Functions to be supported by the global resource manager 602, in order to configure a small group cell, will be described herein.

The global resource manager 602 may measure an SIR of a small cell adjacent to a subscriber, dynamically and in real time, for example, based on a discontinuous reception (DRX), and may reconstruct a cell coverage and a link by resetting a group cell with a maximum SIR(i) while satisfying a predetermined threshold to be a target group cell.

Figure 7:
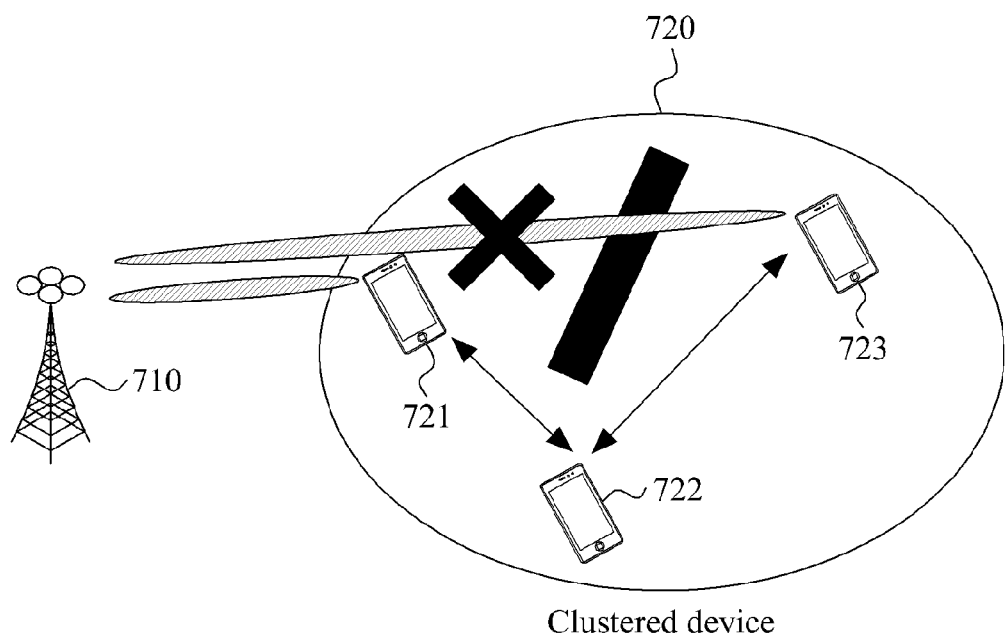
FIG. 7 is a diagram illustrating a communication method in a poor communication situation caused by a non-line of sight (LoS) environment between a base station and a device according to an embodiment of the present invention.

FIG. 7 is a diagram illustrating a communication method in a poor communication circumstance caused by a non-LoS environment between a base station and a device according to an embodiment of the present invention.

Referring to FIG. 7, a clustered device 720, also referred to as a device network, including n predetermined devices that may provide a communication service to a device existing within a non-LoS, through a detour link path. Here, the device clustering 702 may be connected to a base station 710, using a mesh networking scheme between smart devices, a mesh networking scheme between automobiles, or a relay networking scheme. For example, the clustered device 720 may be connected to the base station 710 by a method as follows.

Among devices 721 through 723 included in the clustered device 720, a device exhibiting a best LoS environment with the base station 710 may be searched for based on an SNR, in real time, and the device exhibiting the best LoS environment, for example, the device 721, may be selected to be a master device that may act as a gateway.

The selected master device 721 may accumulate traffic from the other devices 722 and 723 included in the clustered device 720, and may perform transmission and reception with the base station 710, as a representative device.

In addition, the selected master device 721 may transmit and receive a path from the base station 710 to a target device, for example, the device 723, via the relay networking scheme.

In this instance, a wireless personal area network (WPAN), and the like may be applied to the communication service between devices.

Figure 8:
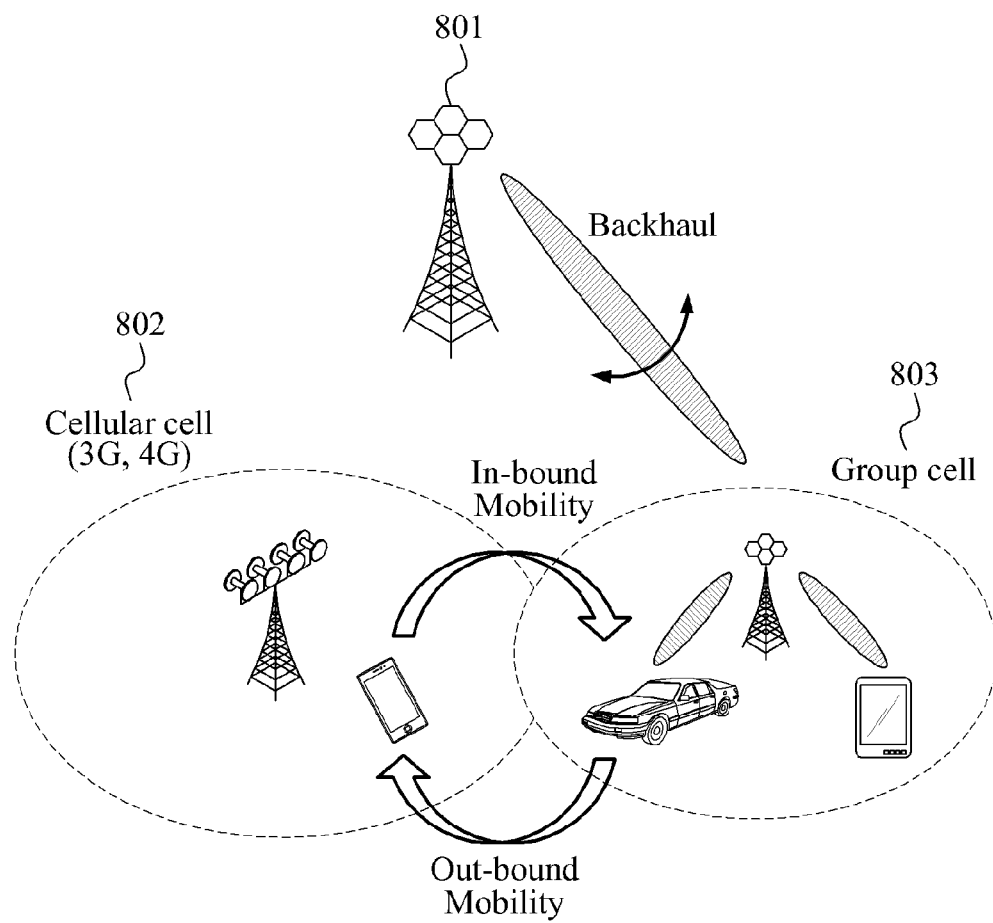
FIG. 8 is a diagram illustrating an example of mobility between a group cell and a general cellular cell in a system configured by a multi-hierarchical cell according to an embodiment of the present invention.

FIG. 8 is a diagram illustrating an example of a mobility between a group cell and a general cellular cell in a system configured by a multi-hierarchical cell according to an embodiment of the present invention.

Referring to FIG. 8, the mobility between the group cell and the general cellular cell may be classified into an out-bound mobility indicating a mobility from a group cell 803 to a cellular cell 802, and an in-bound mobility indicating a mobility from the cellular cell 802 to the group cell 803.

The out-bound mobility may refer to a mobility for a case in which a corresponding device terminal performs handover to an adjacent cellular cell when a communication quality of a small group, for example, a bus, decreases to be lower than a predetermined threshold based on an SIR, due to an instant obstacle, a poor radio environment, and the like. In this instance, a principle identical to a handover mechanism in a general cellular environment may be applied to an operating process of the out-bound mobility.

The in-bound mobility may handover traffic of a cellular band to a cell in an SHF/EHF band corresponding to a non-cellular band, for example, to a small cell 803. Accordingly, from a conventional cellular point of view, an offloading effect of a mobile traffic may be provided.

Figure 9:
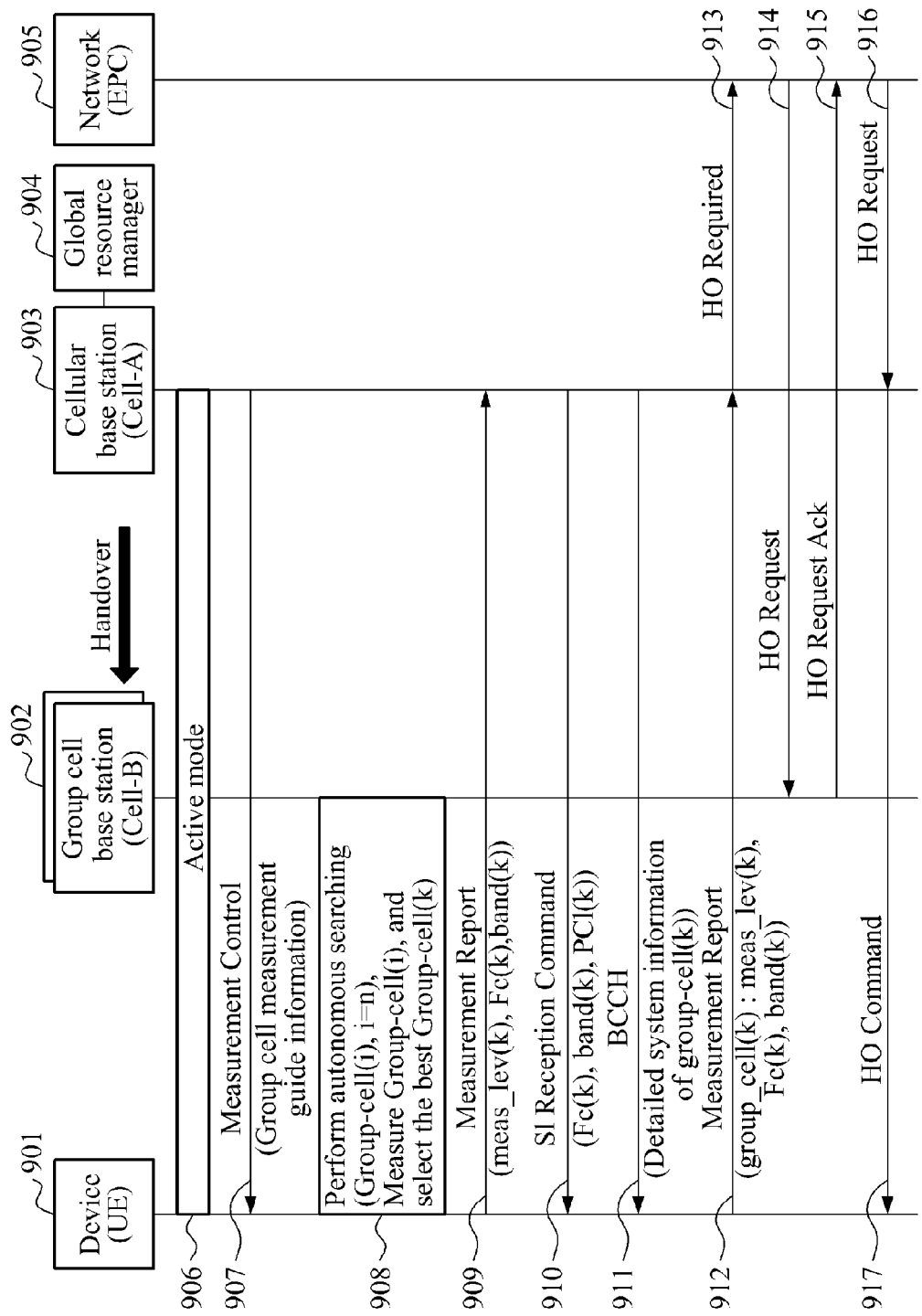
FIG. 9 is a diagram illustrating a flow of a handover process for an in-bound mobility of a device in a system configured by a multi-hierarchical cell according to an embodiment of the present invention.

FIG. 9 is a diagram illustrating a flow of a handover process for an in-bound mobility of a device in a system configured by a multi-hierarchical cell according to an embodiment of the present invention.

Referring to FIG. 9, in operations 906 and 907, a device 901, for example, user equipment (UE), may receive group cell measurement guide information from a cellular base station 903, that is, a cellular cell (cell-A), through a measurement control message when a communication state between the device 901 and the cellular base station 903 becomes an active state, that is, a state of performing communication. In this instance, the measurement control message may be transmitted upon entering a communication operation.

In operation 908, the device 901 may search for adjacent group cells based on the group cell measurement guide information, for example, gap pattern information corresponding to searching visual information of adjacent cells, and may measure SIRs of found adjacent group cells. Here, each adjacent group cell may be indicated as Group-cell(i), wherein i=1~n. The device 901 may determine a group cell with a greatest SIR to be a target group cell for handover. Here, the group cell may be indicated as Group-cell(k), wherein n=k.

In operation 909, the device 901 may compare the SIR of the determined group cell, Group-cell(k), to a measurement report threshold stored internally, transmit a measurement report to the cellular base station 903 when the SIR of the target group cell is greater than the measurement report threshold, and reduce a signaling overhead.

In operations 910 and 911, the cellular base station 903 receiving the measurement report may direct the device 901 to receive a system information message broadcasted by a group cell base station 902, that is, a target group cell (cell-B), using a system information (SI) reception command. In this instance, the device 901 may prepare to perform handover by receiving detailed system information, for example, random access information required to perform initial synchronization with the target group cell 902, and the like.

When the operation 911 of receiving the system information is performed, the device 901 may perform the handover process through operations 912 through 917, which are identical to a handover method for a general cellular cell. In this instance, an in-bound mobility process of 3GPP Rel-10 may be applied. In operation 912, the device 901 may re-transmit the measurement report for reconfirmation, in order to trigger a general handover process.

Figure 10:
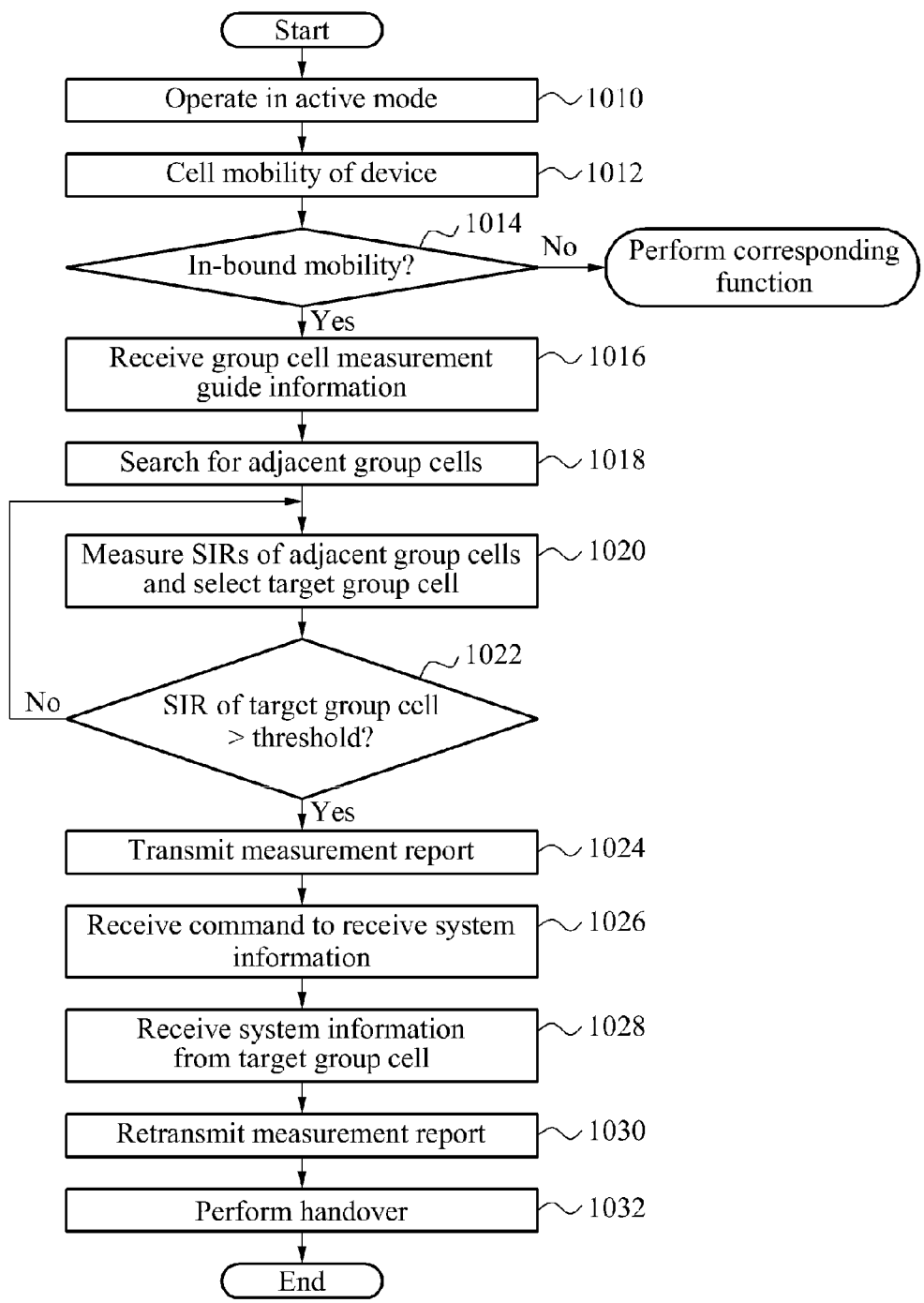
FIG. 10 is a flowchart illustrating a handover process for an in-bound mobility of a device in a system configured by a multi-hierarchical cell according to an embodiment of the present invention.

FIG. 10 is a flowchart illustrating a handover process for an in-bound mobility of a device in a system configured by a multi-hierarchical cell according to an embodiment of the present invention.

Referring to FIG. 10, when a cell mobility of the device is detected in operation 1012 while the device operates in an active mode in operation 1010, whether the cell mobility of the device corresponds to an in-bound mobility or an out-bound mobility may be verified in operation 1014.

When the cell mobility of the device corresponds to the out-bound mobility as a result of operation 1014, the device may apply a principle identical to a conventional handover mechanism in a general cellular environment.

When the cell mobility of the device corresponds to the in-bound mobility as a result of operation 1014, the device may receive group cell measurement guide information from a cellular cell, through a measurement control message, in operation 1016.

In operation 1018, the device may search for adjacent group cells based on the received group cell measurement guide information.

In operation 1020, the device may measure SIRs of found adjacent group cells, and may determine a group cell with a greatest SIR to be a target group cell for handover.

In operation 1022, the device may verify whether the measured SIR of the target group cell is greater than a predetermined measurement report threshold.

When the SIR of the target group cell is less than or equal to the predetermined measurement report threshold as a result of operation 1022, the device may return to operation 1020 to re-measure the SIRs of the adjacent group cells, and may re-determine a group cell with a greatest SIR to be a target group cell for handover.

When the SIR of the target group cell is greater than the predetermined measurement report threshold as a result of operation 1022, the device may transmit a measurement report to the cellular cell, in operation 1024.

When the device receives, from the cellular cell, a command to receive system information of the target group cell, in operation 1026, the device may prepare to perform handover by receiving the system information from the target group cell in operation 1028.

In operation 1030, the device may re-transmit the measurement report in order to trigger a general handover process.

In operation 1032, the device may perform the handover to the target group cell.

The above-described exemplary embodiments of the present invention may be recorded in computer-readable media including program instructions to implement various operations embodied by a computer. The media may also include, alone or in combination with the program instructions, data files, data structures, and the like. The program instructions stored in the media may be specially designed and configured for the present invention, or may be known to those skilled in the art and thereby be implemented.

According to exemplary embodiments, there is provided a system and method for configuring a multi-hierarchical cell in which a large-scale mobile backhaul technology and a small cell technology are combined, which may provide a high quality service and increase a capacity of a wireless system through the combination of the large-scale mobile backhaul technology and the small cell technology.

According to exemplary embodiments, a probability of ensuring a line of sight (LoS) of a clustered device and a wireless backhaul may be improved using a multi-hierarchical link. In addition, real-time reconstruction and use efficiency of overall spectrum resources, a level of interference, virtual radio resources, and the like between hierarchical cells may be improved by a global resource manager positioned in a digital cloud center. Further, mobile traffic offloading effects may be increased through a seamless mobility between a cellular cell and a small group cell.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system having a multi-hierarchical cell, the system comprising:
   a service infrastructure configured to provide accumulated knowledge;
   a device infrastructure comprising devices that are supplied with the accumulated knowledge from the service infrastructure;
   a network infrastructure configured to provide a network connection between the service infrastructure and the device infrastructure; and
   a platform infrastructure configured to perform a task of processing data collected from the device infrastructure and the network infrastructure into knowledge and accumulating the knowledge in the service infrastructure, wherein the network infrastructure includes a radio access network, and the radio access network comprises a digital cloud center, and wherein the digital cloud center analyzes positioning information and radio environment information of a device, and selects and allocates a frequency band most suitable for a corresponding cell in real time;

wherein locations of small cells included in the multi-hierarchical cell are determined such that a line of sight (LoS) radio environment is guaranteed to be at a maximum by a communication common carrier.

2. The system of claim 1, wherein the platform infrastructure comprises:
   a content domain to perform a task required for the service infrastructure based on multi-processing;
   a device domain to perform a task required for the device infrastructure based on single-processing;
   a network domain to perform a task required for the network infrastructure;
   a service platform to be utilized by the content domain or the network domain; and
   a device platform to be utilized by the network domain or the device domain.

3. The system of claim 1, wherein the network infrastructure further includes a core network;
   wherein the radio access network further comprises a global resource manager and the multi-hierarchical cell, radio resources of the multi-hierarchical cell being controlled and managed by the global resource manager that operates in the digital cloud center, and
   wherein the multi-hierarchical cell includes at least one of a macro-cell, a micro-cell, and a pico-cell.

4. The system of claim 3, wherein the digital cloud center integrally manages at least one of available spectrum resources, a level of interference, and a scale of available radio resources of the multi-hierarchical cell managed by the global resource manager.

5. The system of claim 3, wherein the digital cloud center reconstructs a shape of the corresponding cell to be suitable for the allocated frequency band.

6. The system of claim 3, wherein the global resource manager performs at least one of a device mobility management function, and a contents centric network (CCN) function.

7. The system of claim 3, wherein the multi-hierarchical cell is configured by links corresponding to a number of tiers, and frequency bands corresponding to the number of tiers.

8. The system of claim 3, wherein each cell included in the multi-hierarchical cell is connected to an upper level cell or an identical level cell via a radio link or a wired link.

9. The system of claim 1, wherein the locations of the small cells included in the multi-hierarchical cell are determined based on at least one of a maximum number of concurrent subscribers, a maximum supporting transmission rate per subscriber, and an average quality of service (QoS) per service of a subscriber.

10. The system of claim 3, wherein a number of digital cloud centers and locations of the digital cloud centers are determined based on computing powers of the digital cloud centers, a size of a storage space, and a capability of a server that provides the digital cloud centers.

11. The system of claim 3, wherein the digital cloud center is connected to each small cell included in the multi-hierarchical cell by a radio link path of a single hop, and
    each small cell included in the multi-hierarchical cell is connected to other cells via multiple radio links ensuring that a line of sight (LoS) in each small cell is maximally supported.

12. The system of claim 11, wherein the radio link uses a cellular band, or a super high frequency (SHF)/extremely high frequency (EHF) band.

13. The system of claim 11, wherein a frequency band of the radio link changes in real time, depending on a radio environment, when a cognitive radio system (CRS) is applied to the radio link.

14. The system of claim 11, wherein each small cell is a femto-cell in an outdoor environment, and is a wireless fidelity (WiFi) cell in an indoor environment.

* * * * *